US011777895B2

(12) United States Patent
Wada

(10) Patent No.: US 11,777,895 B2
(45) Date of Patent: Oct. 3, 2023

(54) INFORMATION PROCESSING PROGRAM, INFORMATION PROCESSING SYSTEM, AND INFORMATION PROCESSING METHOD FOR COMBINING CHAT INFORMATION INTO CHAT INFORMATION SET

(71) Applicant: Tetsuya Wada, Osaka (JP)

(72) Inventor: Tetsuya Wada, Osaka (JP)

(*) Notice: Subject to any disclaimer, the term of this patent is extended or adjusted under 35 U.S.C. 154(b) by 0 days.

(21) Appl. No.: 17/281,954

(22) PCT Filed: Aug. 28, 2019

(86) PCT No.: PCT/JP2019/033640
§ 371 (c)(1),
(2) Date: Mar. 31, 2021

(87) PCT Pub. No.: WO2020/071013
PCT Pub. Date: Apr. 9, 2020

(65) Prior Publication Data
US 2021/0359970 A1 Nov. 18, 2021

(30) Foreign Application Priority Data
Oct. 1, 2018 (JP) .................. 2018-187004

(51) Int. Cl.
H04L 51/56 (2022.01)
H04L 51/04 (2022.01)
H04L 51/216 (2022.01)

(52) U.S. Cl.
CPC .............. H04L 51/56 (2022.05); H04L 51/04 (2013.01); H04L 51/216 (2022.05)

(58) Field of Classification Search
CPC ....... H04L 51/56; H04L 51/04; H04L 51/216; H04L 51/52; G06F 13/00
See application file for complete search history.

(56) References Cited

U.S. PATENT DOCUMENTS 8,892,666 B1* 11/2014 Jackson ................ H04L 51/216
709/206
2009/0210800 A1* 8/2009 McCann .............. G06Q 10/107
715/752

(Continued)

FOREIGN PATENT DOCUMENTS

| JP | 201377922 A | 4/2013 |
| JP | 201791562 A | 5/2017 |
| WO | 2016060093 A1 | 4/2016 |

OTHER PUBLICATIONS

International Search Report in PCT Application No. PCT/JP2019/033640, dated Nov. 5, 2019, 4pp.

*Primary Examiner* — Nicholas R Taylor
*Assistant Examiner* — Tania M Pena-Santana
(74) *Attorney, Agent, or Firm* — HAUPTMAN HAM, LLP

(57) ABSTRACT

An information processing program is configured to execute: electronic mail processing of processing electronic mails in which messages are exchanged by designating a specific party for each message; chat information acquisition processing of continuously acquiring pieces of chat information in which a specific party is designated and messages are continuously exchanged; chat information combining processing of combining, when the acquired pieces of chat information satisfy a predetermined combining condition, the acquired pieces of chat information with a chat information set which is an aggregate of pieces of already-acquired chat information satisfying the predetermined combining condition; and display processing of processing the chat information set relating to the chat information combining processing so that the chat information set is displayable in the same user interface as that of the private communication information relating to the private communication information processing.

19 Claims, 10 Drawing Sheets

(56) References Cited

U.S. PATENT DOCUMENTS

2012/0198017 A1\* 8/2012 LeVasseur .......... H04L 63/0428
709/206
2017/0310617 A1\* 10/2017 Wada ...................... H04L 51/56
2018/0260782 A1\* 9/2018 Bay ........................ H04L 51/48

\* cited by examiner

FIG. 4A

| CHAT No. | CHAT ID | MESSAGE | CHAT INFORMATION TRANSMISSION DATE AND TIME | |
|---|---|---|---|---|
| ⋮ | ⋮ | ⋮ | ⋮ | |
| 101 | KKKK | THE MATTER RAISED IN YOUR MAIL HAS BEEN DEALT WITH. | 2018/07/07 00:23 | |
| 102 | yyyy | THANK YOU VERY MUCH. | 2018/07/07 09:44 | |
| 103 | OOO | HAVE YOU CHECKED THE MESSAGE? | 2018/07/07 22:18 | |
| 104 | yyyy | I HAVE CHECKED THE MESSAGE. | 2018/07/08 06:35 | |
| 105 | KKKK | BE THAT AS IT MAY, PROJECT A LOOKS AS THOUGH IT WILL GO WELL. | 2018/07/07 06:40 | |
| 106 | KKKK | AS MENTIONED IN OUR EARLIER EMAIL, XXX HAS BEEN COMPLETED. | 2018/07/07 09:18 | |

FIG. 4B

| ACQUISITION No. | USER ID | SUBJECT/COMMENT | TRANSMISSION /POSTING /COMMUNICATION DATE AND TIME | |
|---|---|---|---|---|
| ⋮ | ⋮ | ⋮ | ⋮ | |
| M1 | HHHH | HELLO. I AM FROM HHHH CO., LTD. | 2018/07/07 12:33 | |
| M2 | KKKK | RE: PROJECT A | 2018/07/07 14:12 | |
| T1 | OOO | VIDEO CALL, JULY 7, 18:54 | 2018/07/07 18:54 | |
| S1 | yyyy | WE WAIT FOR YOUR COMMENT. | 2018/07/08 07:25 | |
| M3 | KKKK | RE: XXX | 2018/07/07 06:40 | |

# INFORMATION PROCESSING PROGRAM, INFORMATION PROCESSING SYSTEM, AND INFORMATION PROCESSING METHOD FOR COMBINING CHAT INFORMATION INTO CHAT INFORMATION SET

RELATED APPLICATIONS

This application is the U.S. National Phase of and claims priority to International Patent Application No. PCT/JP2019/033640, filed on Aug. 28, 2019, which claims priority under 35 U.S.C. § 119 to Japanese Patent Application No. 2018-187004, filed on Oct. 1, 2018, which are incorporated herein by reference in their entirety.

TECHNICAL FIELD

The present invention relates to an information processing program, an information processing system, an information processing method, and screen information which are configured to acquire and combine messages from a message exchange service (message exchange site) in which messages are continuously transmitted by a program, for example, a so-called messenger application, and display the acquired and combined messages on electronic mail display means.

BACKGROUND ART

In recent years, along with the development of the Internet, tools for exchanging private communication information, for example, electronic mail, have become very important as means for transmitting information in corporate activities. Hitherto, for example, an electronic mail system like that described in Patent Literature 1 has been used in companies.

Meanwhile, services relating to social networks, for example, a social networking service referred to as "SNS" are provided and are gaining popularity as a new communication tool.

There has been developed an information processing system capable of displaying electronic mails and pieces of social information of a such social network service in a unified manner by displaying the pieces of social information of the social network service on an electronic mail system. For example, in Patent Literature 2, there are described an information processing program, an information processing system, and an information processing method which are configured to extract pieces of social information satisfying a predetermined extraction condition from pieces social information posted on the Internet, and to process the extracted social information so that the extracted social information can be handled in the same manner as the exchange of personal communication information such as electronic mails.

Further, in Patent Literature 2, there is described a chat information exchange service (chat information exchange site) in which a specific party is designated and messages are continuously exchanged. In the chat information exchange service, pieces of chat information (for example, messages) are continuously transmitted from a so-called messenger application to a chat server, and the transmitted pieces of chat information are seamlessly arranged in chronological order by the messenger application to enable the pieces of information to be exchanged in a lighthearted manner like that of a conversation. Moreover, the information processing program described in Patent Literature 2 processes pieces of chat information so that the pieces of chat information can be handled in the same manner as the exchange of pieces of private communication information such as electronic mails.

CITATION LIST

Patent Literature

[PTL 1] JP 2013-77922 A
[PTL 2] WO 2016/060093 A1

SUMMARY OF INVENTION

Technical Problem

The above-mentioned information processing program, information processing system, and information processing method of Patent Literature 2 enable pieces of social information and pieces of chat information to be handled in the same manner as the exchange of the pieces of private communication information such as electronic mails. However, in the chat information exchange service, large pieces of chat information are continuously transmitted, and therefore when those pieces of chat information are handled individually in the same manner as the exchange of electronic mails, the number of pieces of chat information is overwhelming compared to the number of the electronic mails. As a result, there is a problem in that it becomes difficult or cumbersome to find a desired electronic mail, and the display area of a user interface is filled with the pieces of chat information.

In view of the above, it is an object of the present invention to provide an information processing program, an information processing system, an information processing method, and screen information which are configured to acquire so-called messenger type chat information, combine the acquired pieces of chat information to form a chat information aggregate, and display the chat information aggregate on electronic mail display means, for example.

Solution to Problem (1) According to one embodiment of the present invention, there is provided an information processing program, which is configured to execute: electronic mail processing of processing electronic mails in which messages are exchanged by designating a specific party for each message; chat information acquisition processing of continuously acquiring pieces of chat information in which a specific party is designated and messages are continuously exchanged; chat information combining processing of combining, when the acquired pieces of chat information satisfy a predetermined combining condition, the acquired pieces of chat information with a chat information set which is an aggregate of already-acquired pieces of chat information satisfying the predetermined combining condition; and display processing of processing the chat information set relating to the chat information combining processing so that the chat information set is displayable in the same user interface as a user interface of the electronic mails relating to the electronic mail processing, wherein the display processing includes enabling the electronic mails and the chat information set to be displayed in the user interface alongside each other in chronological order.

In the above-mentioned information processing program, of the large pieces of messenger-type chat information exchanged continuously by designating a specific party, a part of the pieces of chat information is acquired and combined to generate a chat information set, and the generated chat information set is displayed in the user interface alongside the electronic mail.

With this configuration, a block of a chat information set and electronic mails are arranged alongside each other, which prevents large pieces of chat information and electronic mail messages from being arranged alongside each other and the electronic mails from being buried in large pieces of chat information. Therefore, less information is displayed in the user interface, and hence it becomes easier for the user to grasp the overall picture.

(2) The information processing program is further configured to execute at least one of: social information extraction processing of extracting pieces of social information posted on the Internet; and telephone communication information processing of acquiring pieces of telephone communication information, and the display processing includes enabling at least one of the social information or the telephone communication information, the electronic mail, and the chat information set to be displayed in the user interface alongside each other in chronological order.

The above-mentioned information processing program prevents, in addition to the electronic mails, for example, pieces of social information and pieces of telephone communication information from being buried in large pieces of chat information. Therefore, less information is displayed in the user interface, and hence it becomes easier for the user to grasp the overall picture.

(3) In the information processing program, the user interface may be configured to display in time series a history relating to a specific information communication party, and the specific information communication party is selectable.

With this configuration, the chat information set and the acquired pieces of information other than the chat information can be displayed alongside each other on a so-called timeline displaying the history of a specific information communication party in time series. As a result, the acquired pieces of information other than the pieces of chat information are not buried in large pieces of chat information, and therefore it becomes easier to grasp a correspondence history with the specific information communication party.

(4) In the information processing program according to Items (1) to (3), the chat information set may be formed from at least one piece of the chat information based on the combining condition that, at a date and time at which each piece of the chat information is transmitted or received, at least one of the electronic mail, the social information, and the telephone communication information has not been acquired during dates and times of transmission of a plurality of consecutive pieces of the chat information.

With this configuration, a block of chat information can be easily and conveniently formed as a chat information set at the date and time of transmission or reception of the chat information. As a result, it becomes easier to distinguish between the chat information set and acquired pieces information other than the pieces of chat information, and it becomes easier to grasp the correspondence history.

(5) In the information processing program according to Items (1) to (3), the combining condition may be a condition that the pieces of chat information are transmitted within a predetermined period, the predetermined period may be determined in advance so that a fixed period is continuous, and the chat information set may be formed by collecting the transmitted pieces of chat information for each fixed period.

With this configuration, most users are expected to behave habitually, and therefore a chat information aggregate in which pieces of chat information have been appropriately collected can be formed by continuously collecting the pieces of chat information for a fixed period of time in accordance with those habits.

(6) In the information processing program according to Items (1) to (3), the combining condition may be a condition that the pieces of chat information are transmitted within a predetermined period, the predetermined period may be determinable by a user, and the chat information set may be formed by collecting the transmitted pieces of chat information for each predetermined period determined by the user. With this configuration, the pieces of chat information that the user wishes to collect are collected, and therefore a chat information aggregate in which the pieces of chat information have been appropriately collected can be formed.

(7) In the information processing program according to Items (1) to (3), the combining condition may be a condition that the pieces of chat information are transmitted within a predetermined period, the predetermined period may be determinable by an operator, and the chat information set may be formed by collecting the transmitted pieces of chat information for each predetermined period determined by the user. With this configuration, the operator appropriately collects the chat information, and therefore a chat information aggregate in which the pieces of the chat information have been appropriately collected can be formed.

(8) The information processing program may be further configured to execute, based on an operation by the user, separation and display processing of separating one chat information set and displaying each of a plurality of pieces of chat information combined in the separated chat information set. With this configuration, individual pieces of chat information in the chat information set, which is a collection of a plurality of pieces of chat information, can be confirmed, and therefore it is possible to examine the pieces chat information in detail even though the pieces chat information can be handled in the same way as the electronic mails.

(9) The information processing program may be further configured to execute, based on an operation by the user, before/after chat information display processing of displaying the pieces of chat information before the first chat information among the chat information set, or displaying the pieces of chat information after the last chat information among the chat information set. With this configuration, not only the pieces of the chat information collected in the chat information aggregate, but also the pieces of chat information transmitted before and after the pieces of chat information in the chat information aggregate can be confirmed, and therefore highly relevant chat information can be easily viewed.

(10) The information processing program may be further configured to execute thread combining processing of combining the private communication information and the pieces of chat information set into a single thread, and the display processing may include enabling the thread to be displayed in the user interface in chronological order. With this configuration, information can be easily managed by combining the private communication information and the chat information set as a single thread.

(11) According to one embodiment of the present invention, there is provided an information processing system including: an electronic mail processing unit configured to process electronic mails in which messages are exchanged by designating a specific party for each message; a chat information acquisition unit configured to continuously acquire pieces of chat information in which a specific party is designated and messages are continuously exchanged; a chat information combining unit configured to combine, when the acquired pieces of chat information satisfy a predetermined combining condition, the acquired pieces of chat information with a chat information set which is an aggregate of already-acquired pieces of chat information satisfying the predetermined combining condition; and a display processing unit configured to process the chat information set relating to the chat information combining processing so that the chat information set is displayable in the same user interface as a user interface of the electronic mails relating to the electronic mail processing, wherein the display processing includes enabling the electronic mails and the chat information set to be displayed in the user interface alongside each other in chronological order.

In the above-mentioned information processing system, of the large pieces of messenger-type chat information exchanged continuously by designating a specific party, a part of the pieces of chat information is acquired and combined to generate a chat information set, and the generated chat information set is displayed in the user interface alongside the electronic mail.

With this configuration, a block of a chat information set and electronic mails are arranged alongside each other, which prevents large pieces of chat information and electronic mail messages from being arranged alongside each other and the electronic mails from being buried in large pieces of chat information. Therefore, less information is displayed in the user interface, and hence it becomes easier for the user to grasp the overall picture.

(12) In the information processing system, the chat information combining unit may be configured to combine a plurality of pieces of chat information in accordance with a predetermined combining condition, and the chat information set may be formed from at least one piece of the chat information based on the combining condition that, at a date and time at which each piece of the chat information is transmitted or received, at least one of the electronic mail, the social information, and the telephone communication information has not been acquired during dates and times of transmission of a plurality of consecutive pieces of the chat information.

With this configuration, a block of pieces of chat information can be easily and conveniently formed as a chat information set at the date and time of transmission or reception of the pieces of chat information. As a result, it becomes easier to distinguish between the chat information set and the acquired pieces of information other than the pieces of chat information, and it becomes easier to grasp the correspondence history in the user interface of the information processing system.

(13) In the information processing system, the chat information acquisition unit may be configured to acquire the piece of chat information of a plurality of chat groups to which a specific user belongs. With this configuration, even when large pieces of chat information are acquired from a plurality of chat groups, the acquired pieces information other than the pieces of chat information are not buried in the chat information. Therefore, less information is displayed in the user interface, and hence it becomes easier for the user to grasp the overall picture.

(14) In the information processing system, the user interface may be configured to display in time series a history relating to a specific information communication party, and the specific information communication party may be selectable. With this configuration, the chat information set and the acquired pieces of information other than the pieces of chat information can be displayed alongside each other on a so-called timeline displaying the history of a specific information communication party in time series. As a result, the acquired pieces of information other than the pieces chat information are not buried in large pieces of chat information, and therefore it becomes easier to grasp a correspondence history with the specific information communication party.

(15) According to one embodiment of the present invention, there is provided an information processing method including: an electronic mail processing step of processing electronic mails in which messages are exchanged by designating a specific party for each message; a chat information acquisition processing step of continuously acquiring pieces of chat information in which a specific party is designated and messages are continuously exchanged; a chat information combining unit step of combining, when the acquired pieces chat information satisfy a predetermined combining condition, the acquired pieces of chat information with a chat information set which is an aggregate of already-acquired pieces of chat information satisfying the predetermined combining condition; and a display processing step of processing the chat information set relating to the chat information combining processing so that the chat information set is displayable in the same user interface as a user interface of the electronic mails relating to the electronic mail processing, wherein the display processing step includes enabling the electronic mails and the chat information set to be displayed in the user interface alongside each other in chronological order.

In the above-mentioned information processing method, of the large pieces of messenger-type chat information exchanged continuously by designating a specific party, a part of the pieces of chat information is acquired and combined to generate a chat information set, and the generated chat information set is displayed in the user interface alongside the electronic mail.

With this configuration, a block of a pieces of chat information set and electronic mails are arranged alongside each other, which prevents large pieces of chat information and electronic mails from being arranged alongside each other and the electronic mails from being buried in large pieces of chat information. Therefore, less information is displayed in the user interface, and hence it becomes easier for the user to grasp the overall picture.

(16) The chat information combining processing step may include combining a plurality of pieces of chat information in accordance with a predetermined combining condition, and the chat information set may be formed from at least one piece of the chat information based on the combining condition that, at a date and time at which each piece of the chat information is transmitted or received, other pieces of information to be displayed in the user interface have not been acquired during dates and times of transmission of each of a plurality of consecutive pieces of the chat information.

With this configuration, a block of chat information can be easily and conveniently formed as a chat information set at the date and time of transmission or reception of the pieces of chat information. As a result, it becomes easier to distinguish between the chat information set and acquired pieces information other than the pieces of chat information, and it is possible to easily provide screen information on which it is easy to grasp the correspondence history.

(17) In the information processing method, the user interface may be configured to display in time series a history relating to a specific information communication party, and the specific information communication party may be selectable. With this configuration, the chat information set and acquired pieces information other than the pieces of chat information can be displayed alongside each other on a so-called timeline displaying the history of a specific information communication party in time series. As a result, the acquired pieces information other than the pieces of chat information are not buried in large pieces of chat information, and therefore it becomes easier to grasp a correspondence history with the specific information communication party.

(18) There is provided screen information including: pieces chat information acquired by designating a specific party and continuously exchanging messages; and pieces of acquired information other than the pieces of chat information, wherein the screen information is formed by executing: chat information combining processing of combining, when the acquired pieces of chat information satisfy a predetermined combining condition, the acquired pieces of chat information with a chat information set which is an aggregate of already-acquired pieces of chat information satisfying the predetermined combining condition; and display processing of processing the chat information set relating to the chat information combining processing so that the chat information set is displayable in the same user interface as a user interface of the other acquired information, and wherein the display processing includes enabling the electronic mails and the chat information set to be displayed in the user interface alongside each other in chronological order.

In the above-mentioned screen information, of the large pieces of messenger-type chat information exchanged continuously by designating a specific party, a part of the chat information is acquired and combined to generate a chat information set, and the generated chat information set is displayed in the user interface alongside the electronic mails.

With this configuration, a block of a chat information set and electronic mails are arranged alongside each other, which prevents large pieces of chat information and electronic mails from being arranged alongside each other and the electronic mails from being buried in large pieces of chat information. Therefore, less information is displayed in the user interface, and hence it becomes easier for the user to grasp the overall screen information.

Advantageous Effects of Invention

According to the present invention, it is possible to provide the information processing program, the information processing system, the information processing method, and the screen information which are configured to acquire so-called messenger type chat information, combine the acquired pieces of chat information to form a chat information aggregate, and display the chat information aggregate on the electronic mail display means, for example.

BRIEF DESCRIPTION OF DRAWINGS

FIGS. 4A and 5B are conceptual diagrams for showing acquired pieces of information acquired by the server apparatus illustrated in FIG. 3, in which FIG. 4A is a table for showing acquired pieces of chat information, and FIG. 4B is a table for showing acquired electronic mails, one piece of social information, and one piece of telephone communication information.

DESCRIPTION OF EMBODIMENTS

[Information Processing System]

An information processing system S according to an embodiment of the present invention is now described in detail with reference to the drawings. The information processing system S can acquire pieces of information, for example, electronic mail, social information, telephone communication information, and chat information, and collectively manage the acquired pieces of information. Further, an information processing program according to the present invention is executed by a server apparatus 20, and is configured to operate in cooperation with information processing devices 10 included in the information processing system S so that the information processing system S can perform the above-mentioned collective management.

Figure 1:
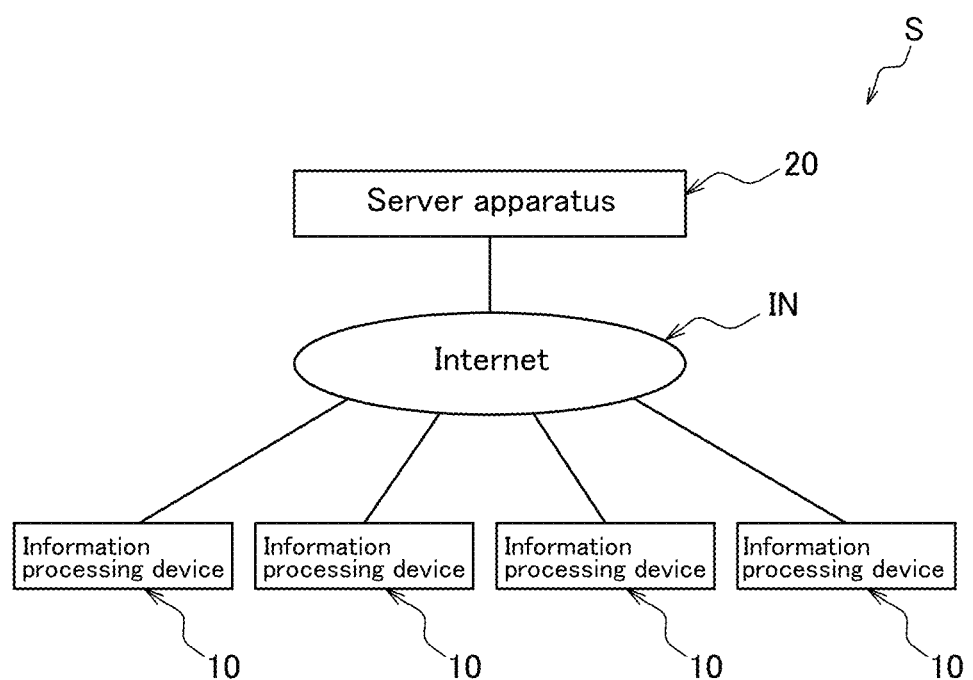
FIG. 1 is a system concept diagram for illustrating an outline of an information processing system according to an embodiment of the present invention.

FIG. 1 is a concept diagram for illustrating a concept of management and operation of the information processing system S according to this embodiment. As illustrated in FIG. 1, the information processing system S according to this embodiment includes a plurality of information processing devices 10 and a server apparatus 20. The plurality of information processing devices and the server apparatus 20 are connected to each other via the Internet IN. Each of the plurality of information processing devices 10 is used by a general user. The server apparatus 20 is managed and operated by an operating entity of the information processing system S. That is, the information processing system S is a system configured to provide a so-called cloud service.

Figure 2:
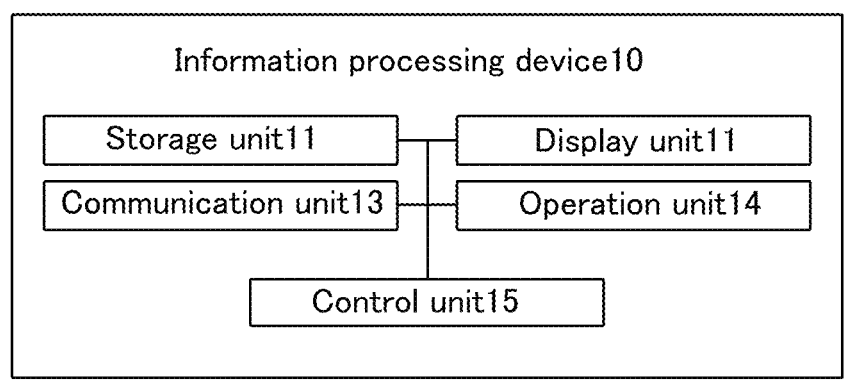
FIG. 2 is a function block diagram for illustrating a configuration of an information processing device included in the information processing system of FIG. 1.

The information processing device 10 to be used by a general user is a so-called personal computer (PC), which includes a control device configured to perform information processing, a keyboard and a mouse of an input device, and a display of an output device. The information processing device 10 is connected to the Internet IN. As illustrated in FIG. 2, the information processing device 10 includes function blocks of, for example, a storage unit 11, a display unit 12, an operation unit 14, a communication unit 13, and a control unit 15 based on a well-known hardware configuration of, for example, a CPU, a memory, an HDD or an SSD, a keyboard, and a display.

The storage unit 11 of the information processing device 10 includes a well-known hard disk drive (HDD) or solid-state drive (SSD) as a main component, and is configured to store information acquired by the information processing device 10 and to retrieve and process the information as required.

The display unit 12 of the information processing device 10 includes a well-known liquid crystal display as a main component, and can display information processed by the information processing device 10. For example, the display unit 12 can display information acquired via the Internet IN by using viewing software, for example, a well-known browser. The display unit 12 can display, for example, screen information acquired from the server apparatus 20 via the Internet IN by using a browser.

The operation unit 14 of the information processing device 10 includes a well-known input device, for example, a keyboard and a mouse, as a main component, and can perform operations on the information possessed by the information processing device 10. For example, the operation unit 14 can input characters into the information possessed by the information processing device 10 by a user operation on the keyboard. Further, for example, the operation unit 14 can perform operations on the information possessed by the server apparatus 20 via the Internet IN. The user can click on various buttons included in the screen information acquired by the information processing device 10 by operating the mouse.

The communication unit 13 of the information processing device 10 includes a communication device, for example, a network I/F, as a main component, and can communicate to and from various Internet servers, for example, via the Internet IN. For example, the communication unit 13 can acquire screen information transmitted from the server apparatus 20 and access the information possessed by the server apparatus 20 by communicating to and from the server apparatus 20 via the Internet IN.

The control unit 15 of the information processing device 10 includes a control device, for example, a central processing unit (CPU) as a main component, and is configured to control the information processing device 10. For example, the control unit 15 connects the information processing device 10 to the server apparatus 20 via the Internet IN by using the communication unit 13 and acquires screen information from the server apparatus 20. The control unit 15 then displays the screen information on the display unit 12 and stores the screen information in the storage unit 11 based on an operation by the user on the screen information with the operation unit 14.

The server apparatus 20 to be operated by the operating entity of the information processing system S includes a well-known server information storage unit 200 and an operating entity PC connected to the server information storage unit 200. The server information storage unit 200 is a large-scale information storage device configured to manage information. The operating entity PC has substantially the same configuration as that of the information processing device 10 described above, and is configured to use the information processing device 10 and the server apparatus 20 to be able to manage or operate the information processing system S so that the information processing system S functions. The server apparatus may be operated by an operator included in the operating entity.

The server apparatus 20 can connect to, for example, an SNS server and a chat server via a communication network to acquire social information and chat information. Further, the server apparatus 20 can acquire telephone communication information obtained when the user of the information processing device 10 performs telephone communication. The information acquired by the server apparatus 20 is stored in the server information storage unit 200 as acquired information. In this embodiment, acquired information includes an electronic mail, social information, telephone communication information, and chat information.

Figure 3:
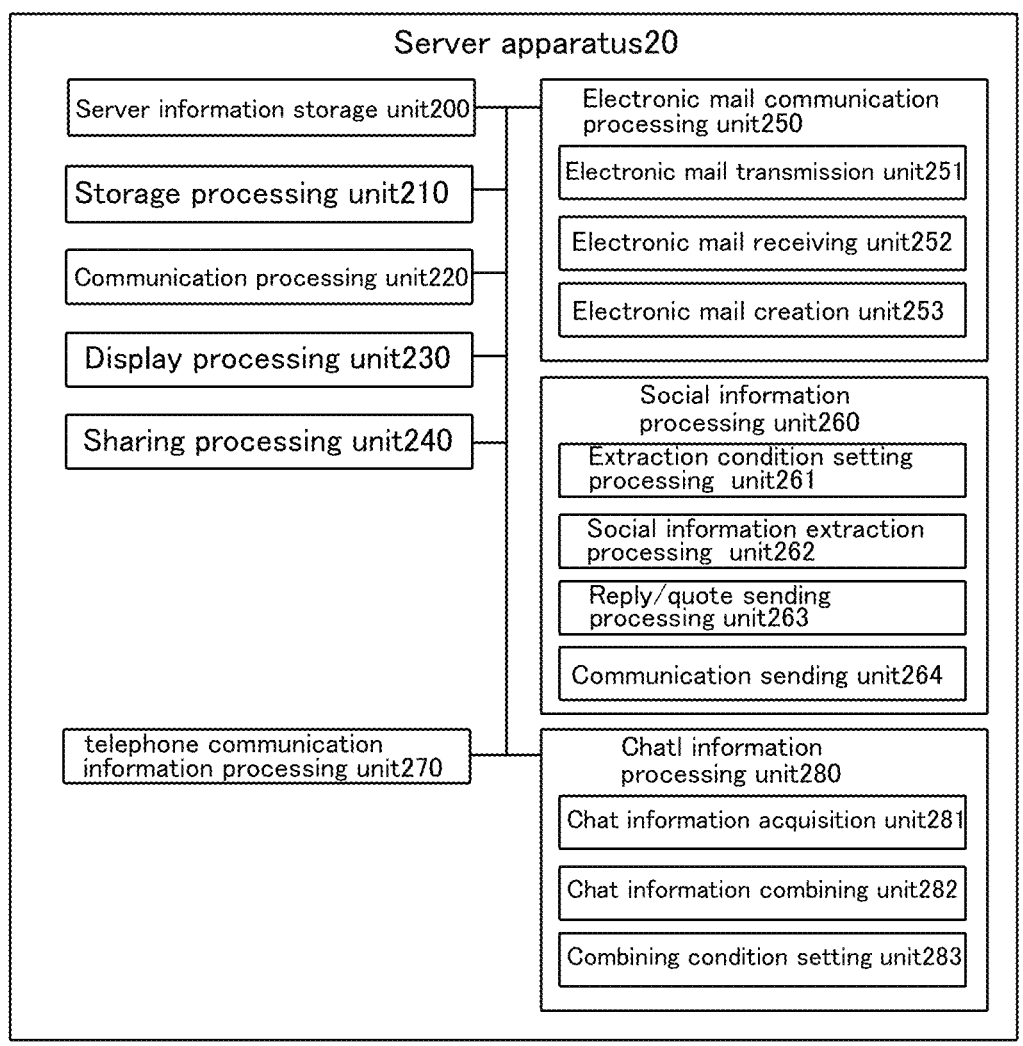
FIG. 3 is a function block diagram for illustrating a configuration of a server apparatus included in the information processing system of FIG. 1.

FIG. 3 is a function block diagram for illustrating an example of a functional configuration of the server apparatus 20. As illustrated in FIG. 3, the server apparatus 20 includes, as a functional configuration, a server information storage unit 200, a storage processing unit 210, a communication processing unit 220, a display processing unit 230, a sharing processing unit 240, an electronic mail communication processing unit 250, a social information processing unit 260, a telephone communication information processing unit 270, and a chat information processing unit 280. The information processing device 10 accesses the server apparatus 20 via the Internet IN, to thereby be able to process information in cooperation with the server information storage unit 200, the storage processing unit 210, the communication processing unit 220, the display processing unit 230, the sharing processing unit 240, the electronic mail communication processing unit 250, the social information processing unit 260, the telephone communication information processing unit 270, and the chat information processing unit 280.

The storage processing unit 210 is configured to store the acquired information, for example, electronic mail, social information, telephone communication information, and chat information, which are acquired by the server apparatus 20, in the server information storage unit 200. The acquired information stored in the server information storage unit 200 can be viewed and operated by the information processing device 10 or the operating entity PC. In addition to storing chat information, the storage processing unit 210 stores a chat information set which combines a plurality of pieces of chat information. The chat information set is described in detail later.

The communication processing unit 220 can execute processing of transmitting the information held by the server apparatus 20 to the information processing device 10 via the Internet IN. For example, the communication processing unit 220 can transmit the screen information generated by the display processing unit 230 to the information processing device 10 in response to a request from the information processing device 10. Further, for example, when accessed from the information processing device 10, the server apparatus 20 can communicate to and from the information processing device 10 during the processing of the information held by the server apparatus 20.

The display processing unit 230 is configured to edit the acquired information, for example, electronic mail, social information, telephone communication information, and chat information, into screen information which is displayable on the display unit 12, for example, a display, in a predetermined user interface (display processing). Specifically, the display processing unit 230 edits, for example, the electronic mail, social information, and chat information stored in the server information storage unit 200 into screen information which is displayable in a predetermined user interface.

Figure 10:
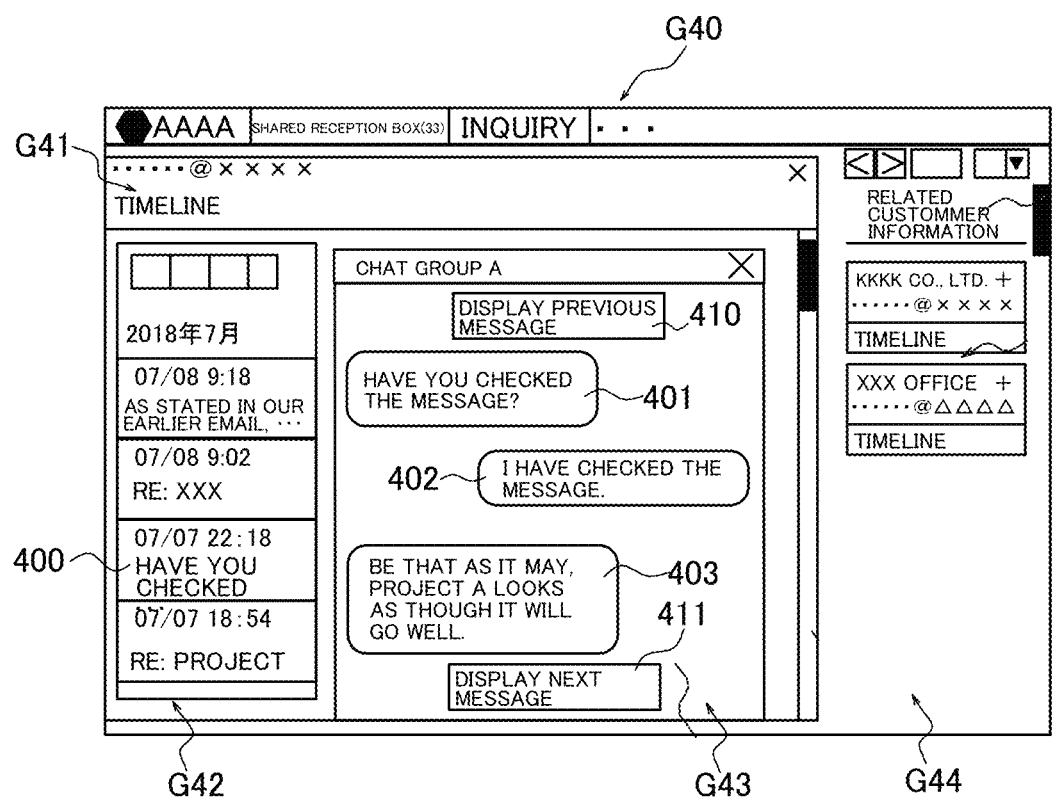
FIG. 10 is a screen view for illustrating another example of the timeline information screen displayed on the information processing device illustrated in FIG. 2.

As illustrated in FIG. 10, the display processing unit 230 can execute, based on an operation by the user, separation and display processing of separating one chat information set and displaying each of a plurality of pieces of chat information combined in the chat information set. Further, the display processing unit 230 can execute, based on an operation by the user, before/after chat information display processing of displaying the chat information which is before the first chat information among the pieces of chat information included in the separated and displayed chat information set, or displaying the pieces of chat information which are next after the last chat information among the pieces of chat information included in the separated and displayed chat information set.

The sharing processing unit 240 is configured to execute processing for sharing information on the electronic mail, social information, telephone communication information, and chat information among the plurality of information processing devices 10 connected to a predetermined network. For example, the sharing processing unit 240 performs processing so that the data of the electronic mail, social information, telephone communication information, and chat information is viewable among the plurality of information processing devices 10 connected to the Internet IN. As a result, when the electronic mail, social information, telephone communication information, and chat information are exchanged by any of the information processing devices 10 connected to the network, the exchange can be viewed on the other information processing devices 10.

The electronic mail communication processing unit 250 is configured to execute processing relating to communication (transmission and reception) by electronic mails in which messages are exchanged by individually designating a specific party for each message (electronic mail processing). The electronic mail communication processing unit 250 has, as basic functions, the same functions as those of well-known electronic mail software. Specifically, the electronic mail communication processing unit 250 includes, for example, an electronic mail transmission unit 251, an electronic mail receiving unit 252, and an electronic mail creation unit 253.

The electronic mail transmission unit 251 is configured to perform information processing for transmitting electronic mails. The electronic mail receiving unit 252 is configured to perform information processing for receiving the electronic mails. The electronic mail creation unit 253 is for implementing a function of creating electronic mail by the user of the information processing device 10. The transmitted or received electronic mail to be processed by the electronic mail communication processing unit 250 and the data relating to the electronic mail being created are edited and processed into screen information by the display processing unit 230 so as to be displayable in a predetermined user interface.

The social information processing unit 260 is configured to process pieces of social information posted on the Internet IN. The social information processing unit 260 has a function of extracting social information which matches an extraction condition from among innumerable pieces of social information, and handling the extracted social information in the same manner as the electronic mail.

The social information handled by the social information processing unit 260 may be, for example, pieces of information posted on a service or website capable of constructing a social network, for example, a miniblog (microblog) or a social network service (SNS). Therefore, the social information is not information sent to a specific person like the electronic mail, but is information sent for the purpose of being read by unspecified persons. That is, the social information differs from the electronic mail in that the social information is not information sent to the user of the information processing device 10. However, social information also includes information having a limited disclosure destination. Therefore, the social information may be information that can be viewed only by a specific group or a specific individual.

The social information processing unit 260 includes, for example, an extraction condition setting processing unit 261, a social information extraction processing unit 262, a reply/quote sending processing unit 263, and a communication sending unit 264. The social information handled by the social information processing unit 260 is processed as screen information by the display processing unit 230 so as to be displayable in a predetermined user interface.

The extraction condition setting processing unit 261 is configured to execute processing of setting an extraction condition for extracting desired social information from innumerable pieces of social information posted on the Internet IN (extraction condition setting processing). Various extraction conditions can be adopted as the extraction condition that can be set by the extraction condition setting processing unit 261. Examples of the extraction conditions include a condition that a particular keyword, for example, a company name, a product name, or a service name, is included or not included, a posting date and time of the social information, the gender of the poster, and location information on where the post is performed.

The social information extraction processing unit 262 is configured to execute processing of extracting from the pieces of social information posted on the Internet IN social information satisfying the extraction condition set by the extraction condition setting processing unit 261 (social information extraction processing). The method of extracting messages by the information extraction processing unit is not particularly limited, and for example, in addition to a search engine, which is a known method, the processing may be performed by using so-called artificial intelligence (AI). The social information extraction processing unit 262 can, when other social information, for example, a comment, is added to original extracted social information, combine and extract the added social information with the original social information.

The reply/quote sending processing unit 263 is configured to reply to the social information extracted by the social information extraction processing unit 262 and to post new social information quoting the social information. The social information sent by the reply/quote sending processing unit 263 is posted on the Internet IN via the communication processing unit 220.

The communication sending unit 264 is configured to send social information in order to normally post information to a service, for example, a miniblog or an SNS, or a WEB site, regardless of the social information extracted by the social information extraction processing unit 262.

The telephone communication information processing unit 270 is configured to execute processing of acquiring telephone communication information, for example, voice information and moving image information on telephone communication performed between users of the information processing devices 10. The telephone communication can be performed by Internet voice call or video call, which are known methods. When the server apparatus 20 can acquire the telephone communication information, the user may make a call by using the information processing device 10, or may make a call by other means to transmit the voice information and the video information to the server apparatus 20.

The chat information processing unit 280 is configured to process the chat information transmitted to a chat server, which is a chat information exchange service. The chat information processing unit 280 has a function capable of acquiring pieces of chat information continuously posted to the chat server, combining the acquired chat information to generate a chat information set, and handling the chat information set in the same way as the electronic mail.

The chat information handled by the chat information processing unit 280 indicates, for example, pieces of information continuously transmitted from a plurality of users to the chat server. The chat server creates a group for each of a plurality of specific users, and the pieces of chat information are continuously transmitted within the group. Therefore, the pieces of chat information are continuously exchanged with a specific designated party. That is, like the electronic mail, chat information is information sent to the user of an information processing device 10, but unlike the electronic mail, chat information is not exchanged by designating a specific party for each message, and the messages are exchanged continuously by designating a specific party.

The chat information processing unit 280 includes, for example, a chat information acquisition unit 281, a chat information combining unit 282, a combining condition setting unit 283. The chat information handled by the chat information processing unit 280 is edited and processed into screen information by the display processing unit 230 so as to be displayable in a predetermined user interface.

The chat information acquisition unit 281 is configured to continuously acquire the chat information transmitted to the chat server (chat information acquisition processing). At this time, unlike the social information extraction processing unit 262, the chat information acquisition unit 281 is configured to acquire all pieces of the chat information transmitted to the chat server without considering the condition, for example, for the pieces of chat information. Specifically, the chat information acquisition unit 281 continuously acquires the pieces of chat information transmitted to the chat server.

The chat information acquired by the chat information acquisition unit 281 is managed based on items including, for example, a serial number of the chat information, the person who transmitted the chat information, the content of the chat information, the transmission date and time of the chat information, and the condition for combining the chat information. The management of such chat information is performed by a so-called database management system. For example, the chat information is managed by a management system like a relational database.

The chat information combining unit 282 is configured to combine, when the pieces of chat information acquired by the chat information acquisition unit 281 satisfies a predetermined combining condition, the pieces of acquired chat information with a chat information set, which is an aggregate of existing pieces of chat information satisfying the predetermined combining condition (chat information combining processing). Specifically, the chat information combining unit 282 creates a chat information set satisfying the combining condition.

The combining condition setting unit 283 is configured to execute processing of setting a combining condition for combining chat information (combining condition setting processing). The combining conditions that can be set by the combining condition setting unit 283 can be appropriately set by the user of the information processing device 10 or by the operating entity (including the operator) of the information processing system S. In this embodiment, the combining condition of the chat information is the condition that, based on a comparison of the transmission date and time of the electronic mail, the posting date and time of the social information, and the call date and time of the telephone communication information with the transmission date and time of the chat information, among consecutive pieces of chat information, pieces of chat information are combined when other acquired information does not exist among the pieces of chat information.

FIG. 4A is a table for showing a chat information list which virtually shows in a table format the pieces of chat information acquired by the server apparatus 20. FIG. 4B is a table for showing a chat information list which virtually shows in a table format the acquired pieces of information other than the pieces of chat information acquired by the server apparatus 20, that is, electronic mail, social information, and telephone communication information.

As shown in FIG. 4A, pieces of chat information having chat numbers "101" to "106" have been continuously acquired from the chat server by the server apparatus 20. As shown in FIG. 4B, electronic mails, social information, and telephone communication information are acquired by the server apparatus 20 at any time.

Based on the transmission date and time of the acquired information, electronic mail M1 and M2 and telephone communication information T1 are acquired before consecutive chat numbers "103", "104", and "105", that is, between a chat number "103" and a chat number "102". Further, social information Si and an electronic mail M3 are acquired after consecutive chat numbers "103" "104", and "105", that is, between the chat number "105" and the chat number "106".

In this embodiment, the combining condition of the chat information is the condition that, based on a comparison of the transmission date and time of the electronic mail, the posting date and time of the social information, and the call date and time of the telephone communication information (hereinafter referred to as "transmission date and time of the acquired information") with the transmission date and time of the chat information, among consecutive pieces of chat information, other acquired information does not exist among the pieces of chat information. Therefore, the chat number "103," the chat number "104," and the chat number "105" satisfy the combining condition, and a chat information set different from the chat information set to which the chat number "102" and the chat number "105" belong is generated.

For example, the combining condition may be a condition that the chat information has been transmitted within a predetermined period, and the predetermined period may be determined in advance so that a fixed period (for example, 24 hours) is continuous. As another example, the combining condition may be a condition that the chat information has been transmitted within a predetermined period, and the predetermined period may be determinable by the user. Further, for example, the combining condition may be a condition that the chat information has been transmitted within a predetermined period, and the predetermined period may be determinable by the operator. In those cases, a chat information set is formed by collecting the pieces of transmitted chat information for each fixed period. Moreover, various conditions can be adopted, such as the inclusion of the transmission date and time of the chat information in a predetermined period, the inclusion of a predetermined keyword, and the transmission of an aggregate formation signal during the transmission of the pieces of chat information by the user.

Compared with a related-art social information processing system (refer to WO 2016/060093 A1), in which an exchange information acquisition processing unit is configured to generate and capture messages for a fixed period as a bundle of messages on the chat server side, the chat information processing unit 280 is different in terms of the point that the pieces of chat information are sequentially acquired, and combined by the chat information combining unit 282 based on a predetermined combining condition. Therefore, the chat information processing unit 280 forms one chat information set which includes a plurality of pieces of chat information after having sequentially acquired many pieces of chat information without receiving data (chat information set) corresponding to large pieces of chat information at one time, and displays the chat information set on the user interface. Therefore, large pieces of pieces of chat information are not arranged on the user interface as in the case for the electronic mail.

[Information Processing Method]

Figure 5:
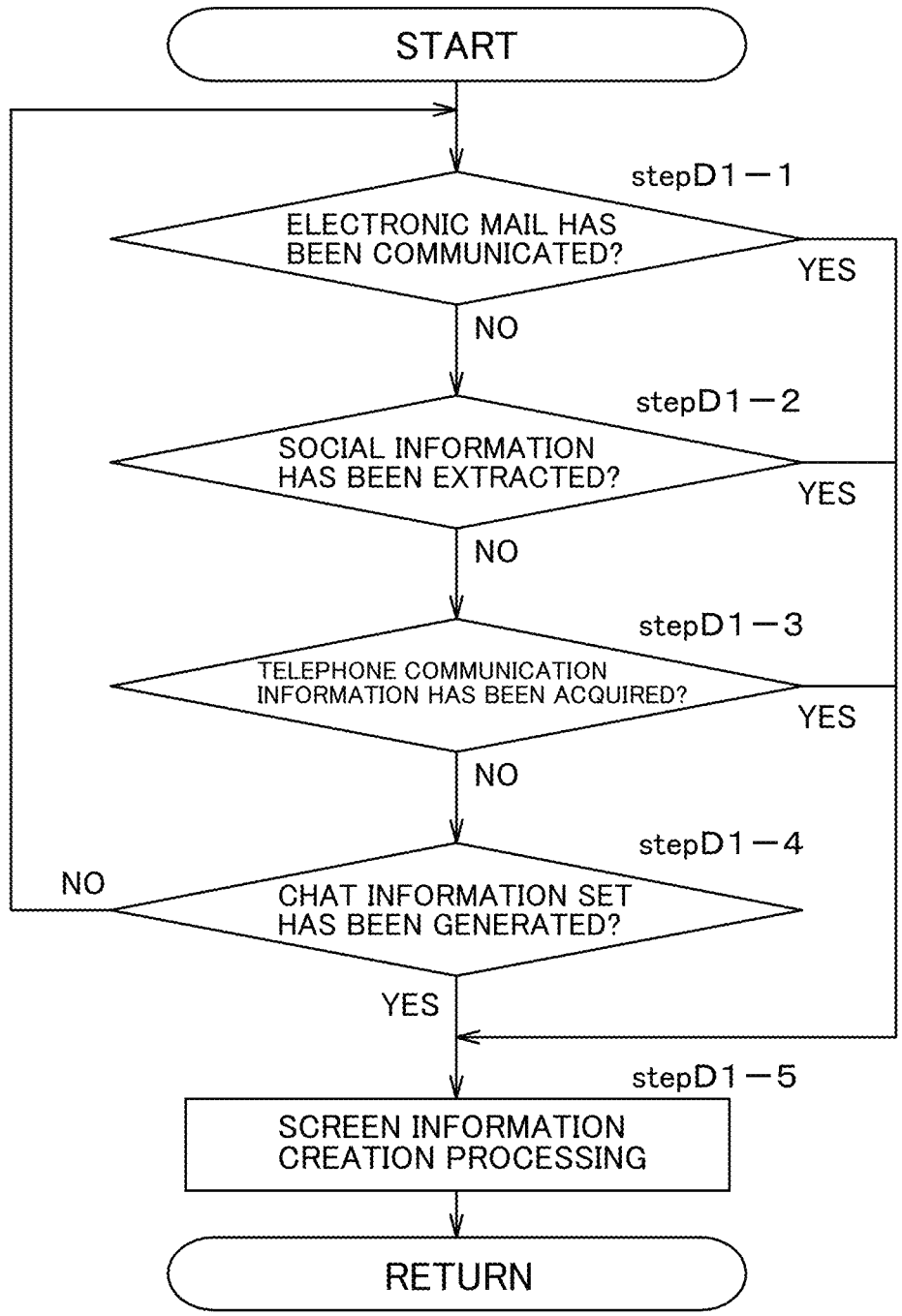
FIG. 5 is a flowchart for illustrating a screen information creation flow to be executed by the server apparatus illustrated in FIG. 3.

Next, in an information processing method implemented by the above-mentioned information processing system S, the flow of the information processing (screen information creation flow) performed at the time of editing the electronic mail, social information, telephone communication information, and chat information into screen information displayable in a predetermined user interface is described in detail with reference to the flowchart illustrated in FIG. 5.

(Step D1-1)

First, in Step D1-1, the server apparatus 20 of the information processing system S determines whether or not an electronic mail has been communicated (transmitted or received). Specifically, the display processing unit 230 determines whether or not an electronic mail has been communicated by the electronic mail communication processing unit 110. Then, when the electronic mail has been communicated, the screen information creation flow advances to Step D1-5, and when the electronic mail has not been communicated, the screen information creation flow advances to step D1-2.

(Step D1-2)

In Step D1-2, the server apparatus 20 of the information processing system S determines whether or not social information has been extracted. Specifically, the display processing unit 230 determines whether or not the social information has been extracted by the social information extraction processing unit 262. When the social information satisfying an extraction condition set in advance is posted to a social information server, the social information extraction processing unit 262 can extract the social information from the social information server. Then, when the social information has been extracted, the screen information creation flow advances to Step D1-5, and when the social information has not been extracted, the screen information creation flow advances to Step D1-3.

(Step D1-3)

In Step D1-3, the server apparatus 20 of the information processing system S determines whether or not telephone communication information has been acquired. Specifically, the display processing unit 230 determines whether or not the telephone communication information has been acquired by a telephone communication information acquisition processing unit. At this time, when the telephone communication information has been acquired, the screen information creation flow advances to Step D1-5, and when the telephone communication information has not been acquired, the screen information creation flow advances to step D1-4.

(Step D1-4)

In Step D1-4, the server apparatus 20 of the information processing system S determines whether or not a chat information set has been generated. Specifically, the display processing unit 230 determines whether or not a new chat information set (chat information set list) has been generated by the chat information acquisition unit 281 and stored in the server information storage unit 200. The generation of the new chat information set is described in detail later in relation to the chat information processing flow. Then, when the new chat information set has been generated, the screen information creation flow advances to Step D1-5, and when the new chat information set has not been generated, the screen information creation flow returns to Step D1-1.

(Step D1-5)

In Step D1-5, the information processing system S displays the new electronic mail, social information, or chat information set in the same user interface. Specifically, the display processing unit 230 communicates each electronic mail, extracts the social information, or generates a chat information set, and displays screen information (refer to FIG. 9 and FIG. 10) arranged in a time series. As a result, the chat information set can be handled in the same manner as in the electronic mail, social information, and telephone communication information, and can be managed in a unified manner.

Then, the screen information creation flow is executed repeatedly, and each time an electronic mail, social information, telephone communication information, and a chat information set are newly transmitted, extracted, called, or generated, the electronic mail, social information, telephone communication information, or chat information set is added to the screen information created earlier.

In this embodiment, a chat information set is formed by using the combining condition in which acquired pieces information other than the pieces of chat information have not been acquired by the server apparatus 20 based on the transmission date and time of each of a plurality of pieces of consecutive chat information. Therefore, for example, when the acquired pieces of information like that shown in FIGS. 4A and 4B are acquired by the server system, the chat number "103", the chat number "104", and the chat number "105" satisfy the combining condition, and a chat information set different from the chat information set to which the chat number "102" and the chat number "106" belong is generated. Similarly, another chat information set is generated for the chat number "106".

Figure 6:
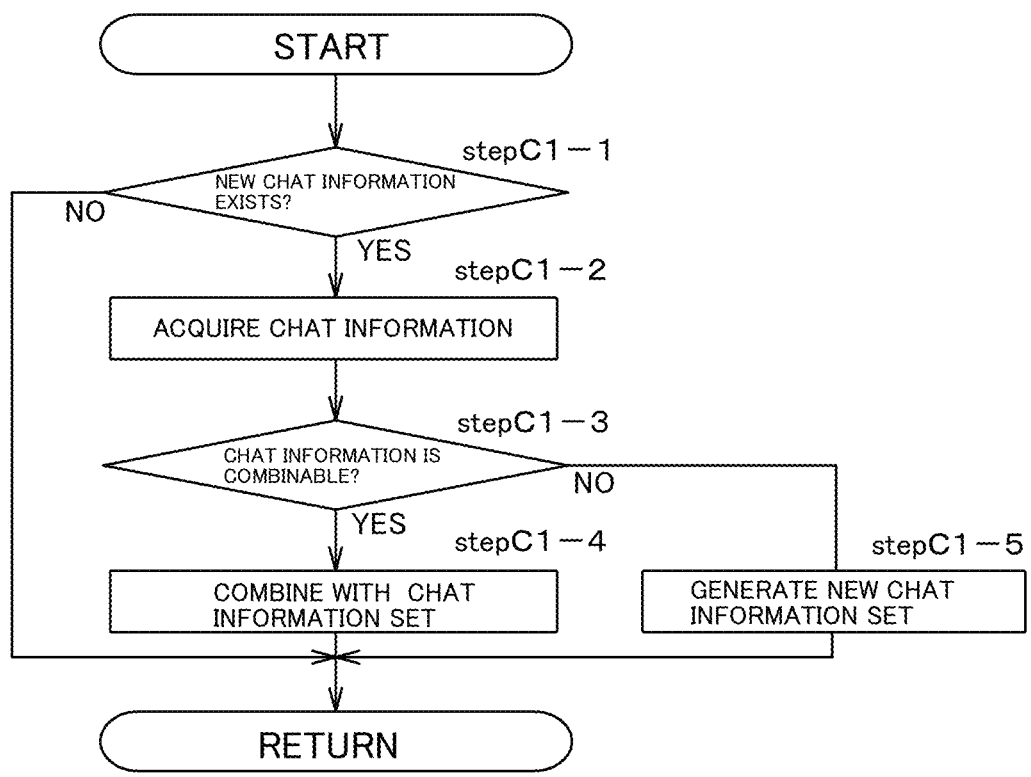
FIG. 6 is a flowchart for illustrating a chat information processing flow to be executed by the server apparatus illustrated in FIG. 3.

Next, in the chat information processing executed by the chat information processing unit 280 in the server apparatus 20 of the information processing system S, the flow of the information processing (chat information processing flow) in which a new chat information set is generated from the pieces of chat information, or the pieces of chat information are combined with an existing chat information set is described in detail with reference to the flowchart illustrated in FIG. 6.

In this embodiment, a chat information set is formed by using the combining condition that acquired information other than the chat information has not been acquired by the server apparatus 20 based on the transmission date and time of each of the plurality of pieces of consecutive chat information. That is, based on the transmission date and time of the acquired information, when acquired pieces information other than the pieces of chat information do not exist between the pieces of continuously acquired chat information, the pieces of chat information are combined. Further, when the chat information is transmitted next after the acquired pieces of information other than the pieces of chat information, a new chat information set is generated.

(Step C1-1)

In Step C1-1, the chat information processing unit 280 determines whether or not new chat information exists in the chat server. Specifically, the chat information acquisition unit 281 determines, based on the last chat information stored in the server information storage unit 200, whether or not the chat information which is next after the last chat information exists. Then, when it is determined that the new chat information exists, the screen information creation flow advances to Step C1-2, and when it is determined that the next chat information does not exist, the chat information processing flow temporarily ends, but is repeated on a regular basis.

(Step C1-2)

In Step C1-2, the chat information processing unit 280 acquires the next chat information from the chat server. Specifically, the chat information acquisition unit 281 receives the next chat information from the chat server and stores the received next chat information in the server information storage unit 200. A chat information storage unit is configured to manage the information by using a so-called database management system. For example, the chat information is managed by a management system like a relational database. Then, the chat information processing flow advances to Step C1-3.

(Step C1-3)

In Step C1-3, the chat information processing unit 280 determines whether or not the newly acquired chat information is combinable with the existing chat information set. Specifically, the chat information combining unit 282 determines whether or not the chat information acquired in Step C1-2 satisfies the predetermined combining condition to be used when the existing chat information set is generated.

In this embodiment, when other acquired information does not exist between the last chat information already acquired and the newly acquired chat information based on the transmission date and time at which the chat information is transmitted, it is determined that the newly acquired chat information satisfies the combining condition, and when the other acquired information does exist, it is determined that the newly acquired chat information does not satisfy the combining condition.

Then, when it is determined that the acquired chat information is combinable with the existing chat information set, the chat information processing flow advances to Step C1-4, and when it is determined that the acquired chat information is not combinable with the existing chat information set, the chat information processing flow advances to Step C1-5.

(Step C1-4)

In Step C1-4, the chat information processing unit 280 executes processing of combining the acquired chat information with the existing chat information. Specifically, the chat information combining unit 282 combines the acquired chat information with the chat information set, which is an aggregate of the existing chat information satisfying the predetermined combining condition. In this processing, the chat information combining unit 282 combines the acquired chat information with the already created chat information set by writing the chat information in the chat information set list satisfying the combining condition. Then, the chat information processing flow temporarily ends, but is repeated on a regular basis.

(Step C1-5)

In Step C1-5, the chat information combining unit 282 generates the newly acquired chat information as a new chat information set. Specifically, the chat information combining unit 282 creates the acquired chat information as a new chat information set list, and stores the created chat information set list in the server information storage unit 200. Then, the chat information processing flow temporarily ends, but is repeated on a regular basis.

The chat information processing processing flow is repeatedly executed every time a predetermined period of time elapses. Therefore, when a plurality of pieces of chat information are transmitted to the chat server during a predetermined period of time, the chat information is acquired in the chronological order in which the chat information is transmitted, and stored in the server information storage unit 200. Then, in accordance with the predetermined combining condition, the large number of pieces of chat information stored in the server information storage unit 200 are combined with the existing chat information set, or a new chat information set is generated.

Screen Display Example

The user interface displayed by the display unit 12 of the information processing device 10 described above is now described with reference to FIG. 7 to FIG. 10. In FIG. 7 to FIG. 10, there are illustrated examples of screen views displayed on a display, which is the display unit 12 in the information processing device 10. Those screen views show a user interface displayed by a browser.

Figure 7:
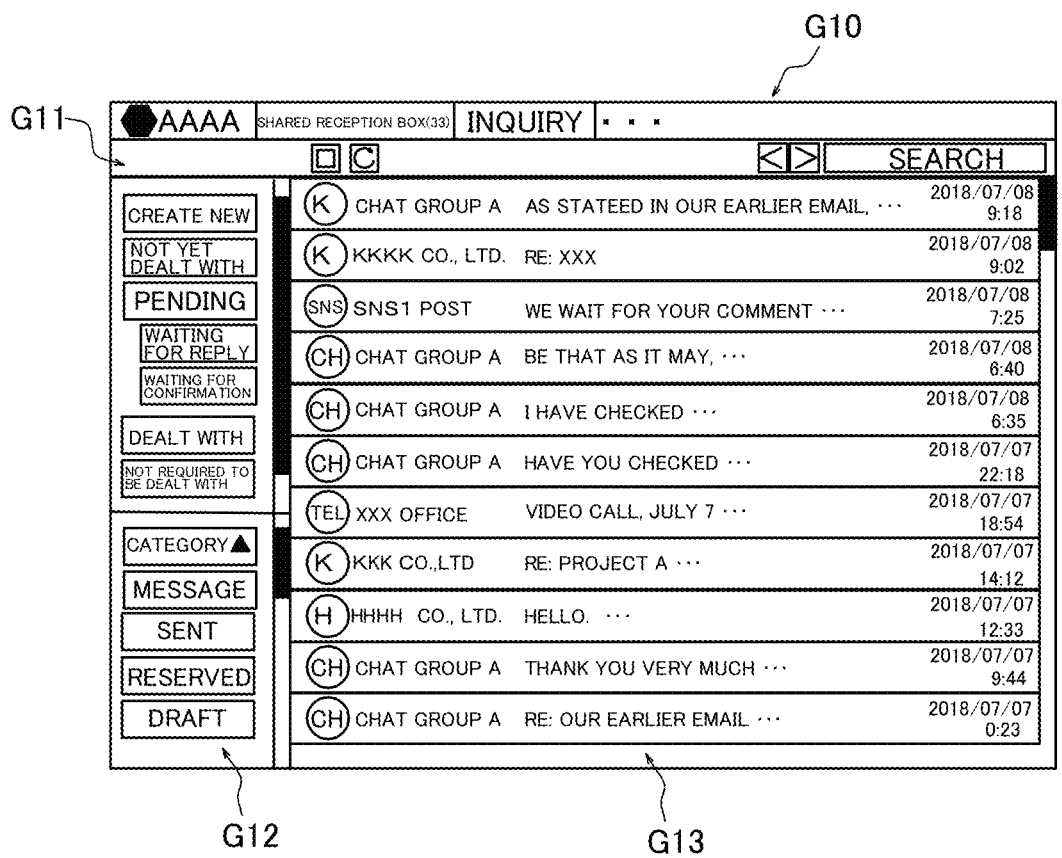
FIG. 7 is a screen view for illustrating an acquired information list screen displayed on the information processing device illustrated in FIG. 2.

In FIG. 7, there is illustrated an example of screen information displaying a list, that is, an acquired information list screen G10, of acquired information acquired by an information processing system, for example, electronic mail, social information, telephone communication information, and chat information. The acquired information list screen G10 roughly includes an upper display bar G11 extending from the upper left to the upper right of the screen, a left column G12 in which folders for sorting the acquired information are vertically displayed in a list, and a center-right column G13 in which the acquired pieces of information are vertically displayed in a list.

The upper display bar G11 includes, in addition to various buttons for changing the display content, for example, a name of the information processing program, and a search window for searching for, for example, an electronic mail by a keyword. The electronic mail, social information, telephone communication information, or chat information set containing the keyword can be retrieved and displayed by inputting the keyword in the search window.

In the left column G12, various buttons for displaying folders are vertically displayed. For example, the pieces of acquired information can be sorted into folders by, for example, dragging and dropping the electronic mail, social information, telephone communication information, or chat information from a center right column G23 to each folder to designate the destination.

In the center right column G13, a list of the acquired pieces of information are vertically displayed in chronological order. Specifically, the electronic mails, social information, telephone communication information, and chat information are displayed in chronological order so that newly acquired information is on top. Further, by scrolling up and down, pieces of acquired information not displayable on the screen can be displayed in the center right column G13. Therefore, pieces of older acquired information can further be displayed by scrolling down. The center right column G13 can also arrange the acquired information so that older acquired information is on top. When one piece of acquired information in the center right column G13 is clicked on, the detailed contents of the information are displayed (refer to FIG. 8).

In this embodiment, the pieces of acquired information are arranged in the center right column G13 in chronological order of newer date and time based on the date and time of transmission of the electronic mail, the posting date and time of the social information, the call date and time of the telephone communication information, and the transmission date and time of the chat information. In the acquired information list screen G10, the pieces of chat information are not displayed as the chat information set, but is displayed as individual pieces of chat information. The pieces of acquired information illustrated in FIG. 7 are related to the pieces of acquired information shown in FIGS. 4A and 4B.

Figure 8:
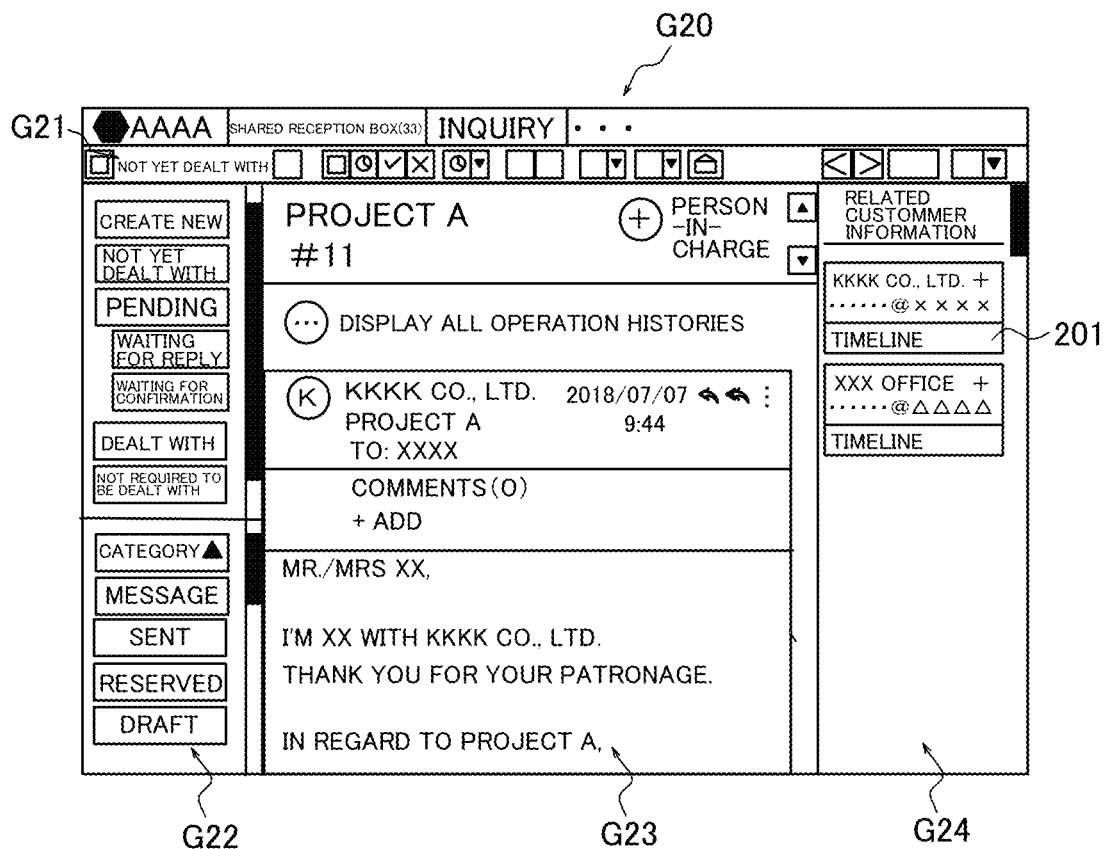
FIG. 8 is a screen view for illustrating an acquired information detail screen displayed on the information processing device illustrated in FIG. 2.

In FIG. 8, there is illustrated an example of screen information, that is, an acquired information detail screen G20, displaying the detailed contents of one piece of acquired information selected from the list of the pieces of acquired information displayed on the acquired information list screen G10. The acquired information detail screen G20 roughly includes an upper display bar G21 extending from the upper left to the upper right of the screen, a left column G22 in which folders for sorting electronic mails are vertically displayed in a list, a center column G23 displaying details of the acquired information, and a right column G24 displaying information on an information communication party relating to the acquired information displayed in the center column G23.

The upper display bar G21 of the acquired information detail screen G20 roughly includes, similarly to the upper display bar G11 of the acquired information list screen G10, various buttons for changing the display content. On the left column G22, various buttons for displaying folders are vertically displayed in a similar manner to the left column G11 of the acquired information list screen G10.

The center column G23 displays the detailed contents of one piece of acquired information. Specifically, the detailed contents of the acquired information selected on the acquired information list screen G10 are displayed. For example, when the acquired information to be displayed in detail is an electronic mail, for example, the title, sender, recipient, date and time of reception, and contents of the electronic mail are displayed. As another example, when the acquired information to be displayed in detail is social information, the details of one piece of social information, that is, for example, the poster, the posting destination SNS site, the posting date and time, and the message are displayed. Further, for example, when the acquired information to be displayed in detail is telephone communication information, for example, a play button for playing the contents of the telephone communication, a call party, a call start time, and a call end time are displayed. Moreover, for example, when the acquired information to be displayed in detail is one pieces of chat information, the details of the one piece of chat information, that is, for example, the sender, the chat group, the transmission date and time, and the message are displayed.

The right column G24 displays information communication party information on the acquired information displayed in the center column G23. A "timeline" button 201 is displayed below the information communication party. When the "timeline" button 201 is clicked on, a timeline information screen G30 for the information communication party is displayed (refer to FIG. 9). The information communication party relating to the acquired information includes, in the case of the electronic mail, the sender and the recipient (including "TO," "CC," and "BCC"), and in the case of social information, includes the poster of the social information or the poster of a comment to the social information. In the case of telephone communication information, the information communication party includes a telephone communication party (in the case of a group call, all the communication parties), and in the case of chat information, includes the message sender or the message recipient (in the case of a chat group, all of the participants of the group).

Figure 9:
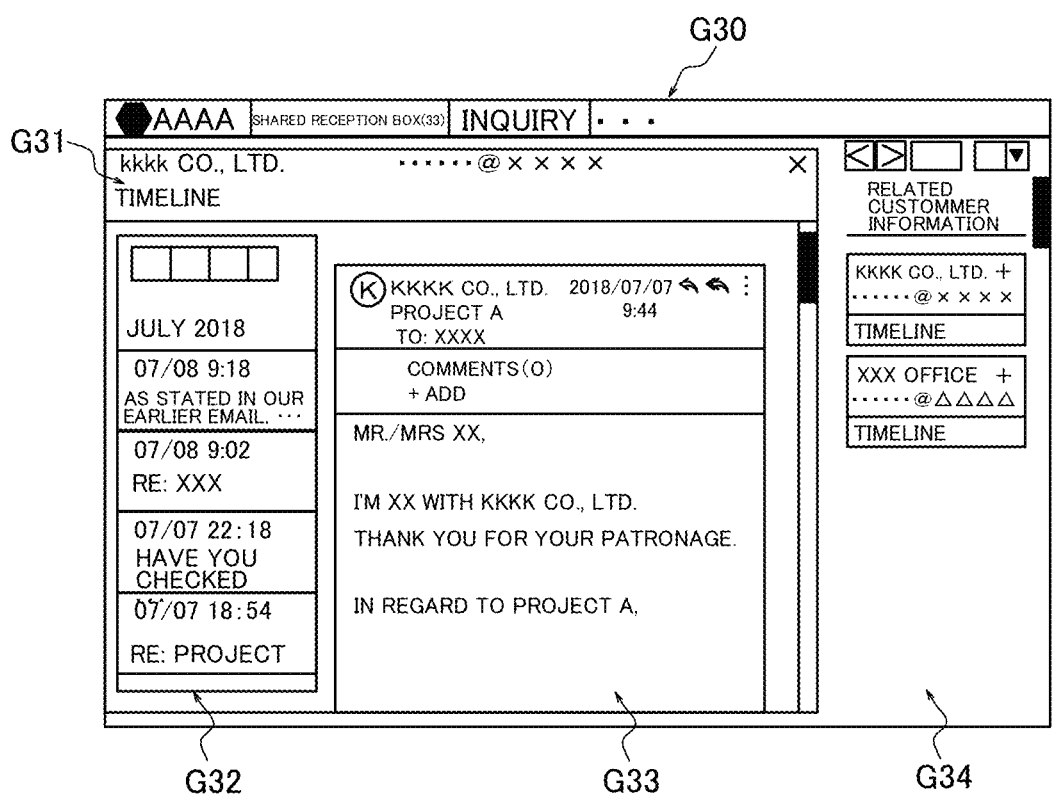
FIG. 9 is a screen view for illustrating an example of a timeline information screen displayed on the information processing device illustrated in FIG. 2.

In FIG. 9, there is illustrated a timeline information screen G30 relating to one piece of timeline information selected from the pieces of information communication party information displayed on the acquired information detail screen G20. The timeline information screen is screen information in which a history relating to a specific information communication party is displayed in time series. Therefore, on the timeline information screen G30, the acquired pieces of information on a specific information communication party are displayed as a list in time series.

The timeline information screen G30 roughly includes a title field G31 extending from the upper left to the upper right of the screen, a left column G32 in which acquired one pieces of information on a specific information communication party is displayed in time series, a center column G33 in which the details of the one piece of acquired information selected from the left column G32 are displayed, and a right column G34 which is similar to the right column G24 of the acquired information detail screen G20.

In the title field G31, the name and electronic mail address of the information communication party relating to the timeline information screen G30 are described. The right column G34 has the same display as that of the right column G24 of the acquired information detail screen G20.

In the left column G32, the acquired pieces of information on the specific information communication party are vertically arranged and displayed so that new acquired information is on top. In the left column G32, in addition to individual electronic mails, individual pieces of chat information, and individual pieces of telephone communication information, a chat information set in which a plurality of pieces of chat information are combined is displayed.

Further, in FIG. 9, the details of one piece of acquired information displayed in the left column G32 are displayed in the center column G33. In this embodiment, the details of an electronic mail are displayed in the center column G33. When any one of the pieces of acquired information displayed in the left column G32 is clicked on, the details of the clicked piece of acquired information are displayed. In particular, when the clicked piece of acquired information is one piece of chat information, the chat information detail screen is displayed in the center column G33 (refer to FIG. 10).

In FIG. 10, there is illustrated a timeline information screen G40 for illustrating screen structure substantially similar to that of the timeline information screen G30 of FIG. 9. Therefore, the timeline information screen G40 includes, similar to the timeline information screen G30, a title display bar G41, a left column G42, a center column G43, and a right column G44. The display contents of the center column G43 are different from the center column G43 of the timeline information screen G30.

The center column G43 displays separated pieces of chat information 401, 402, and 403 relating to a chat information set 400 displayed in the left column G42. In this embodiment, the chat information set 400 is, of the pieces of continuously transmitted chat information, a combination of the pieces of chat information 401, 402, and 403 which satisfy the condition. The chat information 401, 402, and 403 correspond to the chat numbers "103," "104," and "105" of FIGS. 4A and 4B, respectively.

The center column G43 also includes a "display previous message" button 410. Through clicking on of the button 410, the chat information of the chat information set generated previous to the chat information set 400 can be displayed. In this embodiment, the chat information set having the chat number "102" can be displayed by clicking on the "display previous message" button 410.

Similarly, the center column G43 also includes a "display next message" button 411. Through clicking on of the button 411, the chat information of the chat information set generated subsequently to the chat information set 400 can be viewed. In this embodiment, the chat information having the chat number "106" can be displayed by clicking on the "display previous message" button 410.

In a case in which predetermined chat information has been transmitted to the chat server to which the server apparatus 20 is connected under a state in which the message of the chat information set is displayed, when the transmitted chat information satisfies the combining condition of the displayed chat information set, the transmitted chat information is displayed below the displayed chat information set. As a result, chat information can be processed in real time by using the information processing device 10.

The information processing device 10 according to the embodiment of the present invention has been described in relation to a mode in which a so-called PC is used. However, the information processing device is not limited to a PC, and the processing may be performed by a smartphone terminal or mobile phone including a touch panel.

In the embodiment of the present invention, the chat information has been described in relation to a mode in which the chat information set is formed based on the transmission date and time. However, the chat information has been described in relation to a mode in which the chat information set is formed based on the date and time of reception by the chat server or the server apparatus 20.

In this embodiment, the combining condition of the pieces of chat information is the condition that, based on a comparison of the transmission date and time of the electronic mail, the posting date and time of the social information, and the call date and time of the telephone communication information with the transmission date and time of the chat information, among consecutive pieces of chat information, other acquired information does not exist among pieces of the chat information. However, the combining condition of the chat information may be another condition. For example, the pieces of chat information including a predetermined keyword may be combined, or only one piece of the chat information sent by a specific party to the chat server may be combined.

In this embodiment, it is possible to execute before/after chat information display processing of displaying, of the chat information set separately displayed on the timeline information screen, the chat information before the first chat information or the chat information next after the last chat information. However, a previous chat information set may be displayed in place of previous chat information, and the next chat information set may be displayed in place of the next chat information. In that case, a plurality of pieces of chat information of each chat information set may be displayed separately in another user interface.

In this embodiment, a previous message and a next message in the chat information set can be viewed by using a "previous message" button or a "next message" button, respectively. However, in place of the "previous message" or "next message" button, a plurality of previous or next messages may be viewed in succession by scrolling.

In this embodiment, the chat information set has been described in relation to a mode in which a chat information set list is created and stored, and the chat information set is displayed as screen information based on the chat information set list. However, the chat information set may be created by combining the pieces of chat information each time the one piece of chat information is displayed as screen information.

In this embodiment, the timeline information screen has been described as an example in which individual electronic mails, individual pieces of social information, individual pieces of telephone communication information, and a chat information set are displayed. However, each piece of acquired information may be combined in accordance with a predetermined combining condition to create a thread, and displayed in thread units. For example, a thread may be created from electronic mails having the same subject line, or in the case of social information, comments to one post may be combined to form a thread.

In addition, threads may be combined so as to include each type of acquired information, for example, an electronic mail, social information, telephone communication information, and a chat information set. For example, the acquired pieces of information received within a predetermined period may be collectively combined to create a thread.

In this embodiment, the chat information set has been described in relation to a mode in which electronic mail, social information, and telephone communication information are displayed alongside each other on the timeline information screen. However, the chat information set is not limited to being displayed on the timeline information screen, and may be displayed on another screen alongside the other acquired information other than the chat information. For example, the chat information set may be displayed on the acquired information list screen alongside the other acquired information other than the chat information.

The above description of a specific embodiment of the present invention has been presented for the purpose of illustration, and the description is not intended to be exhaustive or to limit the present invention to only the matters described above. It is self-evident to those skilled in the art that numerous modifications and changes are possible in view of the above description.

INDUSTRIAL APPLICABILITY

The information processing program, the information processing device, and the information processing method according to the present invention can be effectively used in the field of, for example, business sales activities and customer support, in order to, for example, quickly acquire and respond to social information in which customer information is posted on the Internet.

The invention claimed is:
1. A non-transitory computer readable medium storing an information processing program for causing, when executed by a device, the device to execute:

electronic mail processing for processing electronic mails in which the electronic mails are defined as first messages exchanged by designating a specific party for each of the first messages;

chat information acquisition processing for continuously acquiring and storing pieces of chat information in a storage, in which the pieces of chat information are defined as second messages continuously exchanged with the specific party being designated;

in response to the pieces of chat information satisfying a predetermined combining condition, chat information combining processing for combining the pieces of chat information with a chat information set to generate a further chat information set, wherein the chat information set is an aggregate of the pieces of chat information stored in the storage which satisfy the predetermined combining condition; and display processing for causing the further chat information set to be displayed on a user interface same as that of the electronic mails, wherein the display processing includes causing the electronic mails and the further chat information set to be displayed on the user interface alongside each other in chronological order, and the predetermined combining condition includes a condition that no electronic mail of the electronic mails has been received between the pieces of chat information that were continuously acquired.

2. The non-transitory computer readable medium storing the information processing program according to claim 1, for causing, when executed by the device, the device to further execute at least one of:

social information extraction processing for extracting pieces of social information posted on the Internet, or telephone communication information processing for acquiring pieces of telephone communication information, wherein the display processing includes causing (i) at least one of the pieces of social information or the pieces of telephone communication information, (ii) the electronic mails, and (iii) the chat information set to be displayed on the user interface alongside each other in chronological order.

3. The non-transitory computer readable medium storing the information processing program according to claim 1, for causing, when executed by the device, the device to further execute:

causing the user interface to display in time series a history relating to a specific information communication party, wherein the specific information communication party is selectable.

4. The non-transitory computer readable medium storing the information processing program according to claim 1, wherein the predetermined combining condition includes a further condition that at least one of (i) an electronic mail of the electronic mails, (ii) social information, or (iii) telephone communication information has not been acquired between dates and times at which the pieces of chat information were continuously transmitted or received, and the chat information set is formed from at least one piece of the chat information based on the further condition of the predetermined combining condition.

5. The non-transitory computer readable medium storing the information processing program according to claim 1, wherein the predetermined combining condition includes a further condition that the pieces of chat information are transmitted within a predetermined period of a plurality of predetermined periods, wherein the predetermined period is determined in advance so that each predetermined period of the plurality of predetermined periods is a fixed period continuous from one fixed period to another fixed period, and wherein the chat information set is formed by collecting the pieces of chat information being transmitted for said each predetermined period.

6. The non-transitory computer readable medium storing the information processing program according to claim 1, wherein the predetermined combining condition includes a further condition that the pieces of chat information are transmitted within a predetermined period, wherein the predetermined period is determinable by a user, and wherein the chat information set is formed by collecting the pieces of chat information being transmitted for each predetermined period determined by the user.

7. The non-transitory computer readable medium storing the information processing program according to claim 1, wherein the predetermined combining condition includes a further condition that the pieces of chat information are transmitted within a predetermined period, wherein the predetermined period is determinable by an operator, and wherein the chat information set is formed by collecting the pieces of chat information being transmitted for each predetermined period determined by the operator.

8. The non-transitory computer readable medium storing the information processing program according to claim 1, for causing, when executed by the device, the device to further execute, based on an operation by a user, separation and display processing for separating one chat information set into a plurality of pieces of chat information and displaying each of the plurality of pieces of chat information.

9. The non-transitory computer readable medium storing the information processing program according to claim 1, for causing, when executed by the device, the device to further execute, based on an operation by a user, before/after chat information display processing for displaying the pieces of chat information before first chat information among the pieces of chat information included in the chat information set, or displaying the pieces of chat information after last chat information among the pieces of chat information included in the chat information set.

10. The non-transitory computer readable medium storing the information processing program according to claim 1, for causing, when executed by the device, the device to further execute thread combining processing for combining the electronic mails and the chat information set into a single thread, and wherein the display processing includes causing a plurality of single threads to be displayed on the user interface in chronological order.

11. An information processing system, comprising:

an electronic mail processing unit configured to process electronic mails in which the electronic mails are defined as first messages exchanged by designating a specific party for each of the first messages;

a chat information acquisition unit configured to continuously acquire and store pieces of chat information in a storage, in which the pieces of chat information are defined as second messages continuously exchanged with the specific party being designated;

a chat information combining unit configured to, in response to the pieces of chat information satisfying a predetermined combining condition, combine the acquired the pieces of chat information with a chat information set to generate a further chat information set, wherein the chat information set is an aggregate of the pieces of chat information stored in the storage satisfying the predetermined combining condition; and a display processing unit configured to cause the further chat information set to be displayed on a user interface same as that of the electronic mails, and cause the electronic mails and the further chat information set to be displayed on the user interface alongside each other in chronological order, wherein the predetermined combining condition includes a condition that no electronic mail of the electronic mails has been received between the pieces of chat information that were continuously acquired.

12. The information processing system according to claim 11, wherein the predetermined combining condition includes a further condition that, at least one of (i) an electronic mail of the electronic mails, (ii) social information, or (iii) telephone communication information has not been acquired between dates and times at which the pieces of chat information were continuously transmitted or received, and the chat information set includes is formed from at least one piece of the chat information based on the further condition of the predetermined combining condition.

13. The information processing system according to claim 12, wherein the chat information acquisition unit is configured to acquire the at least one piece of the chat information of a plurality of chat groups to which a specific user belongs.

14. The information processing system according to claim 11, wherein the display processing unit is configured to cause the user interface to display in time series a history relating to a specific information communication party, and wherein the specific information communication party is selectable.

15. An information processing method, comprising:

an electronic mail processing step of processing electronic mails in which the electronic mails are defined as first messages exchanged by designating a specific party for each of the first messages;

a chat information acquisition processing step of continuously acquiring and storing pieces of chat information in a storage, in which the pieces of chat information are defined as second messages continuously exchanged with the specific party being designated;

a chat information combining processing step of combining, in response to the pieces of chat information satisfying a predetermined combining condition, the pieces of chat information with a chat information set to generate a further chat information set, wherein the chat information set is an aggregate of the pieces of chat information stored in the storage which satisfy the predetermined combining condition; and a display processing step of causing the further chat information set to be displayed on a user interface same as that of the electronic mails, wherein the display processing step includes causing the electronic mails and the further chat information set to be displayed on the user interface alongside each other in chronological order, and the predetermined combining condition includes a condition that no electronic mail of the electronic mails has been received between the pieces of chat information that were continuously acquired.

16. The information processing method according to claim 15, wherein the predetermined combining condition includes a further condition that at least one of (i) an electronic mail of the electronic mails, (ii) social information, or (iii) telephone communication information has not been acquired between dates and times at which the pieces of chat information were continuously transmitted or received, and the chat information set is formed from at least one piece of the chat information based on the further condition of the predetermined combining condition.

17. The information processing method according to claim 15, wherein in the display processing step, the user interface displays in time series a history relating to a specific information communication party, and wherein the specific information communication party is selectable.

18. An information processing system, comprising:

a processor configured to acquire and store (i) pieces of chat information in a storage in which the pieces of chat information are defined as messages continuously exchanged with a specific party being designated, and (ii) acquired information other than the pieces of chat information, and in response to the pieces of chat information satisfying a predetermined combining condition, execute chat information combining processing for combining the pieces of chat information with a chat information set to generate a further chat information set, wherein the chat information set is an aggregate of the pieces of chat information stored in the storage which satisfy the predetermined combining condition, and display processing for causing the further chat information set to be displayed on a user interface same as that of the acquired information, wherein the display processing includes causing the acquired information and the further chat information set to be displayed on the user interface alongside each other in chronological order, and the predetermined combining condition includes a condition that said acquired information has not been received between the pieces of chat information that were continuously acquired.

19. The non-transitory computer readable medium storing the information processing program according to claim 1 for causing, when executed by the device, the device to execute:

in response to receiving an electronic mail of the electronic mails between a first piece of chat information and a second piece of chat information after the first piece of chat information, generating a new chat information set with the second piece of chat information satisfying the predetermined combining condition.

\* \* \* \* \*